United States Patent
Diachenko (10) Patent No.: US 9,485,530 B2
(45) Date of Patent: Nov. 1, 2016

(54) WATER DISPENSING AND DISPLAY APPARATUS

(71) Applicant: Vladimir Diachenko, Netanya (IL)

(72) Inventor: Vladimir Diachenko, Netanya (IL)

(73) Assignee: WATER MEDIA INTERNATIONAL LTD, Netanya (IL)

( * ) Notice: Subject to any disclaimer, the term of this patent is extended or adjusted under 35 U.S.C. 154(b) by 0 days.

(21) Appl. No.: 14/447,657

(22) Filed: Jul. 31, 2014

(65) Prior Publication Data

US 2015/0143393 A1    May 21, 2015

(30) Foreign Application Priority Data

Nov. 18, 2013   (RU) ................................ 2013151127
Mar. 18, 2014   (RU) ................................ 2014110198

(51) Int. Cl.
  *H04N 21/414*    (2011.01)
  *H04N 21/231*    (2011.01)
  *H04N 21/24*     (2011.01)
  *H04N 21/4223*   (2011.01)
  *B67D 1/08*      (2006.01)
  *H04N 21/442*    (2011.01)
  *B64D 7/06*      (2006.01)
  *H04N 21/61*     (2011.01)

(52) U.S. Cl.
  CPC ...... *H04N 21/41415* (2013.01); *B67D 1/0877* (2013.01); *H04N 21/231* (2013.01); *H04N 21/24* (2013.01); *H04N 21/4223* (2013.01); *H04N 21/44218* (2013.01); *B64D 7/06* (2013.01); *H04N 21/6125* (2013.01)

(58) Field of Classification Search
  None
  See application file for complete search history.

(56) References Cited

U.S. PATENT DOCUMENTS

2002/0195467 A1    12/2002   Meder et al.
2008/0197146 A1 *   8/2008   Eyler ............................. 222/39
2009/0281892 A1    11/2009   Deakin et al.
2013/0019271 A1 *   1/2013   Chiu et al. .................... 725/80

FOREIGN PATENT DOCUMENTS

WO         2008134562         11/2008

* cited by examiner

*Primary Examiner* — Nicholas Corbo
(74) *Attorney, Agent, or Firm* — Mark M. Friedman (57) ABSTRACT

An apparatus for dispensing liquid, such as water, with the dispensing of the liquid associated with a media presentation, for example, a video presentation, viewable on a monitor of the apparatus by consumers proximate to the apparatus, including the consumer to whom the water is being dispensed, is disclosed. The media presentation begins upon the dispensing of the water, and continues until it is stopped or completes (ends).

22 Claims, 4 Drawing Sheets

WATER DISPENSING AND DISPLAY APPARATUS

CROSS REFERENCES TO RELATED APPLICATIONS

This application is related to and claims priority from commonly owned Russian Utility Model Registration No. 2014110198, entitled: Video-cooler with remote control, filed 18 Mar. 2014, the disclosure of which is incorporated by reference herein.

TECHNICAL FIELD

The present invention, in some embodiments thereof, relates to systems and methods for dispensing water or other liquids while providing presentable media to the consumers in proximity to the dispensing system.

BACKGROUND

Water dispensing machines continue to grow in both popularity and sophistication, as refreshment alternatives to traditional soft drink vending machines. This is because the water being dispensed is a healthier alternative, when compared to soft drinks, with their high sugar and caloric content.

SUMMARY

According to some embodiments of the present invention, there is provided an apparatus for dispensing liquid, such as water, with the dispensing of the liquid associated with a media presentation, for example, a video presentation, viewable on a monitor of the apparatus by consumers proximate to the apparatus, and including the consumer to whom the water is being dispensed. The media presentation begins upon the dispensing of the water, and continues until it is stopped or completes (ends).

Embodiments of methods and systems of the present invention are directed to a computer implemented method for distributing media presentations, and monitoring activity of a button or the like on a water dispensing machine or apparatus being activated so as to activate a specific media presentation, for example, a video presentation. These button activations, tied to display of the video presentations, are reported to a system computer, which can perform analytics on this data, used by the information provider/advertiser associated with the media presentation displayed by the water dispensing machine.

Some embodiments of the present invention are directed to a dispensing apparatus comprising, a display; and, a controller, for example, a logic/computer control unit. The controller is for detecting at least one event and for selecting content from content storage media for displaying on the display, in response to the detection of the at least one event.

Optionally, the dispensing apparatus includes a water dispensing system in electronic communication with the controller.

Optionally, controller is configured for detecting the at least one event comprising water being dispensed from the water dispensing system.

Optionally, the dispensing apparatus additionally comprises sensors for detecting at least one of people in proximity to the machine and motion of people around the apparatus, the sensors in electronic communication with the controller.

Optionally, the dispensing apparatus is such that the controller is configured for detecting the at least one event comprising at least one of people in proximity to the apparatus, and, motion of people around the apparatus.

Optionally, the dispensing apparatus is such that it includes a camera in electronic communication with the controller for recognizing at least one person as at least one of a man, woman, adult, child, male and female.

Optionally, the controller is configured for detecting the at least one event associated with the camera comprising at least one a man, woman, adult, child, male, and female.

Optionally, the content storage media is separate from the controller and the content storage media is in electronic communication with the controller.

Optionally, the controller is configured for linking to a communications network, for example, the Internet.

Optionally, the controller records data associated with each detected event and the content associated with each detected event.

Optionally, the controller transmits the recorded data associated with each detected event and the content associated with each detected event, over the communications network.

Optionally, the controller is configured for detecting a plurality of contemporaneous said events and for selecting content from content storage media for displaying on the display, in response to the detection of the plurality of contemporaneous said events.

Other embodiments are directed to a system comprising: a computer system, which comprises a storage media; and, a processor in communication with the storage media. The processor is programmed to perform the machine executable instructions in the storage media including: receiving data associated with at least one event detected by the at least one remote apparatus and content displayed by the at least one remote apparatus in response to the detected at least one event; and, organizing the data to be available to the provider of the content over the network.

Optionally, computer system additionally comprises: a content storage unit. Additionally and optionally, the processor in communication with the storage media, is programmed to perform the machine executable instructions in the storage media. These instructions additionally include, transmitting content from the content storage unit to at least one remote apparatus for displaying the content contemporaneous with the at least one event, over the communications network.

Optionally, the at least one event of the machine executable instruction includes a plurality of events.

Optionally, the system additionally comprises: at least one remote apparatus wherein the events are selected from at least one of: the dispensing of water, the recognition of at least one person as at least one of a man, woman, adult, child, male, female, the detection of people in proximity to the remote apparatus, and, the detection of motion of people around the remote apparatus, by the remote apparatus, the remote apparatus in electronic communication with the computer system over the communications network.

Other embodiments are directed to a method for providing content. The method comprises: detecting at least one event; obtaining content for display on a display apparatus in response to the detected at least one event and associated with the detected at least one event; and, displaying the content on the display apparatus contemporaneously with event having been detected.

Optionally, the display apparatus includes a water dispensing system in electrical communication with a controller, and the at least one event includes dispensing of water from the water dispensing system.

Optionally, the display apparatus includes a camera and a sensor in electrical communication with the controller, and the at least one event includes a plurality of events including the dispensing of water and at least one of recognition of people from the camera, and the presence of one or more people proximate to the machine from the sensor.

Optionally, the obtaining content for display on the display apparatus in response to the detected plurality of events and associated with the detected plurality of events includes selecting the content for display in accordance with the dispensing of water event and the at least one other event from the camera and the sensor.

Optionally, content includes a media presentation.

Other embodiments are directed to a method for providing content. The method comprises: monitoring the status of at least one machine which presents content in response to an event detected by the at least one machine, over a communications network; receiving data corresponding to content presentations in response to the detection of an event; and, performing analytics on the received data for each content provider associated with the content presented in response to the event detected by the at least one machine.

Optionally, the machine is a water dispensing machine and the event includes an activation of the machine such that water is dispensed from the machine.

Optionally, the network includes the Internet.

Throughout this document, a "server" is, for example, a remote computer or remote computer system, or computer program therein, that is accessible over a communications medium, such as the Internet, that provides services to other computer programs (and their users), in the same or other computers.

Throughout this document including in the drawings, "n" and "$n^{th}$" represent the last member of a series or sequence of items, objects, elements, etc.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more non-transitory computer readable medium(s) may be utilized. The computer readable medium may be a computer readable signal medium or a computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A non-transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored on the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
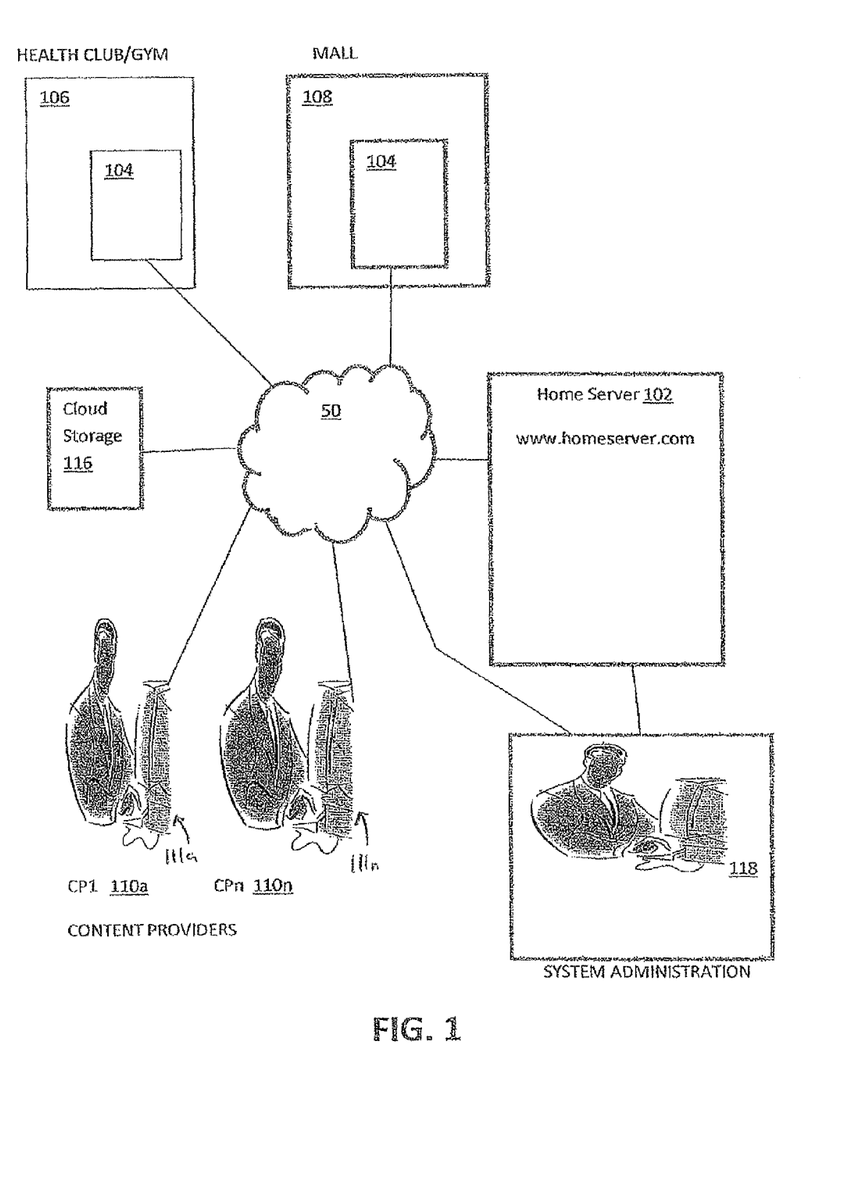
FIG. 1 is a diagram of an exemplary environment on which embodiments of the present invention are performed.

Reference is now made to FIG. 1, which shows an operating environment for a non-limiting exemplary system, formed of a home server (HS) 102 (also known as a central or main server), and a dispensing and presenting machine 104, linked by either wired or wireless links, or combinations thereof, to a communications network 50. The communications network 50 is, for example, a wide area network (WAN), such as a public network, for example, the Internet.

Via the network 50, the home server 102 and each of the machines 104 are electrically linked or electronically linked to each other, so as to be in electronic communication with each other, either directly or indirectly. As used herein, the term "electronic communication" includes electronic, electric and electrical communication, between both external (for example, over the communications network 50) and internal components, devices, computers, elements, and the like, and may also include data communication, between both external (for example, over the communications network 50) and internal components, devices, computers, elements, and the like.

The home server (HS) 102 serves to manage the machines 104 and perform analytics for the content, for example media, such as video advertisements and information, each machine 104 presents to consumers, for example, while the consumers are being provided water by the respective machine 104, or are in a position to view a media presentation on the machine 104. The home server 102 also distributes the content and provides analytic reports of presentations of content by the various machines 104, associated with the home server 102. The home server 102, for example, has a uniform resource locator (URL) of www.homeserver.com.

With reference to the machines 104, "content", "media", and "media presentation", are used interchangeably herein and refer, for example, to any video, audio, graphics, text, and any combination thereof, having information, including advertising, as well as streaming video and software interfaces for user interaction. The machines 104 are located remotely from the home server 102, at locations, for example, represented by a health club/gym 106 and a mall 108.

The analytics are performed, for example, by the home server 102, and are communicated to content providers, for example information providers, including advertisers, 110a to 110n, also linked to the communications network, via their computers 111a, 111n. The content providers 110a-110n may send their information, such as media presentations including, for example, advertisement videos, to the home server 102 over the communications network 50. The home server 102 then distributes the requisite content, such as an advertisement, for example, in the form of a media presentation, to the requisite machine 104. Alternately, the content providers 110a-110n send their data, for example, the aforementioned media presentations, to the requisite machine 104 over the communications network 50. Also, the content providers 110a-110n, can directly load their media presentations to the requisite machine 104, manually, by being at the actual location of the machine 104 itself, such as the health club/gym 106 or mall 108.

There is also a remote server 116, representative of "cloud" servers. In these cloud servers 116, the media presentations and other information to be presented to consumers, via the machines 104, from the content providers 110a-110n may be stored and transmitted accordingly. These cloud servers 116 may be considered as part of the system (home server 102 and machines 104) disclosed herein.

There is also a system administrator 118, who can program the home server 102, communicate with the machines 104, servers 116 and information providers 110, via the communications network 50. The system administrator 118, via his computer 119, is linked to the communications network 50 either directly or indirectly, for example, via the home server 102.

Figure 2:
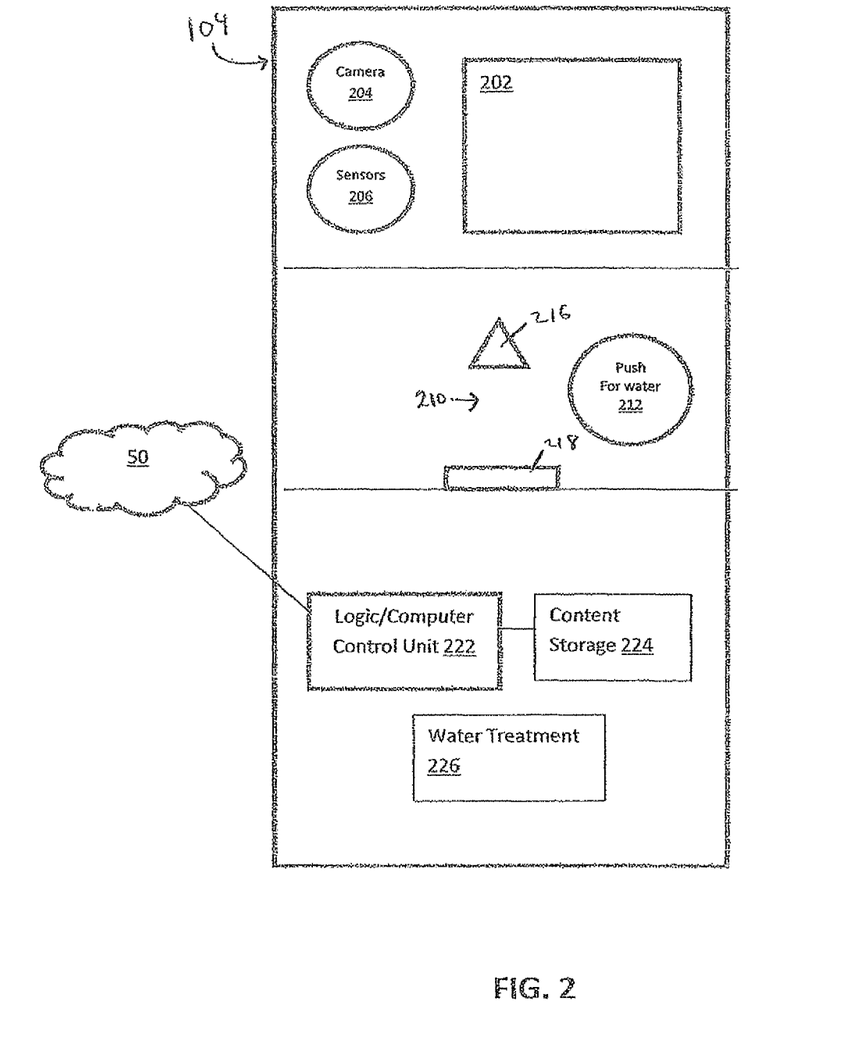
FIG. 2 is a diagram of a machine of FIG. 1.

FIG. 2 shows a machine 104 in detail. The machine 104 is, for example, a water dispensing machine, and includes a video display monitor 202, a camera 204 and sensors 206, including for example, motion sensors and proximity sensors. The video display monitor 202, camera 204 and sensors 206 are electrically connected to the logic/computer control unit 222 or controller, hereinafter referred to as the "control unit."

The video display monitor 202 presents content to consumers, the content for example, in a media presentation, such as in video or graphic form, which typically includes accompanying audio. The media presentation is, for exampled, initiated when consumers dispense water from the machine 104, for example, by one or more of: 1)

activating the push button 212 to dispense water, known as a "push button" event; 2) when the camera 204 sends data to the control unit, and the control unit 222 determines that consumers have been detected, and also, the types of consumers, e.g., men, women, children, known as a "camera" event; and 3) "sensor" events. Example sensor events include detections of motion, from motion sensors of the sensors 206, as consumers pass or move by or into proximity with the machine 104, as determined by the logic of the control unit 222, and when one or more consumers are in proximity to the machine, from data obtained from proximity sensor of the sensors 206. Push button events, camera events and sensor events may individually trigger activation (playing) of a media presentation, or any combination thereof may also activate playing of a media presentation, on the display screen 202.

The machine 104 includes a dispensing mechanism 210, which includes a button 212, electrically linked to the control unit 222, and the water treatment system 226. The button 212 causes opening of a valve, or other regulator, for controlling water flow into a receiving vessel, such as a cup, bottle of the like, of a user, through an outlet 216. The vessel typically rests on a pan 218 which also is open to a drainage system.

Water is fed to the outlet 216 from the water treatment system 226. The water treatment system may include, for example, filters, ultraviolet light, ozonation, reverse osmosis, water cooling/heating systems, aeration, and any other water treatment articles or systems. The water treatment system 226 is positioned intermediate the outlet 216 and a water source (not shown), which may be, for example, a water tank, or a connection to a domestic or municipal water line.

The control unit 222 is a computer, electronic logic device, programmable logic controller, integrated circuit, or other computer type device or unit, or combinations thereof, and, for example, includes processors (e.g., Intel i5), RAM, ROM, system bus, BIOS, operating system, and, hardware and software to perform the logic operations including the functions disclosed herein. These functions include, for example, recognizing that the button 212 has been pushed by a consumer/user to dispense water, facial and body type recognition, to determine, for example, the type of person at the machine, such as men, women, adults, children, males and females, from images from the camera 204, analyze data from the sensors 204, and initiate and control the content selection and its presentation to the consumer(s)/user(s) of the machine 104. The control unit 222 includes internal storage/memory, which stores machine executable instructions associated with the operation of the control unit 222. The control unit 222 also includes a network interface for sending and receiving data over the network 50 as well as transmitters and receivers for data and electronic communication both internally and over the network 50.

The control unit 222 is coupled (electronically including in data communication) with a storage unit 224 where content, including media presentations of information and advertisements, for example, are stored. The content may be uploaded into the storage unit 224 over the network, by the content providers from their computer systems 111a-111n, from the home server 102, or the cloud server 116, or downloaded by the control unit 222 from the content providers' computer systems 111a-111n, the home server 102, or the cloud server 116.

There may be a single media presentation to be presented every time the control unit 222 determines that a presentation is to be displayed in response to an event. For example, a single media presentation is shown when the machine 104 is sponsored for a time period. There may also be or multiple stored presentations, where the logic of the control unit 222, selects the specific presentation to be shown on the display screen 202. As discussed above, the media presentations may be stored in the content storage media 224 upon being uploaded by the machine 104, directly from the content provider 110a-110n over the communications network 50, downloaded from the machine of the content provider, its agent or the like, over the network 50, or loaded directly into the requisite machine 104, manually, by going to the actual location of the machine 104 itself. Additionally, the logic of the control unit 222 may be programmed to obtain the content from servers over the network 50, and download the content into the storage media 224, over the network 50, as well as from the cloud storage 116.

The video monitor 202, camera 204, sensors 206 and push button 212 are electrically coupled or otherwise linked to the control unit 222. The control unit 222 coordinates the presentation of the content, for example, a media presentation, such as a video presentation of an advertisement, in accordance with the initiation of any one of, or any combination of, a push button event, a camera event, or a sensor event.

For example, the control unit 222 is programmed such that the media presentation begins as soon as the button 212 is pushed or otherwise activated, with the advertisement video running during the entire time of water dispensing (unless the water dispensing is longer than the advertisement video, in which case, there is not any additional presentation, the advertisement video is repeated, or another advertisement video follows the initially presented advertisement video). This also holds true for camera events and sensor events.

The control unit 222 can also decide which media presentation to present, in the case of multiple media presentations associated with the push button 212, camera 204 or sensor 206 events. The determination of which media presentation to play on the display screen 202, depends, for example on rules for the play of the media presentation, for example, as set by the content provider. These rules may include time of day, a limit on the number of times the presentation can be played, to whom the media presentation should be played to, adults, children, men, women, and the like. For example, in a camera event, the camera 204 may detect people and the analysis of the images may detect the people as women only, hence the content selected by the control unit 222 is a media presentation on for the video screen 202 which is directed to women. Similarly, should a crowd be detected in an area proximate to the machine 104, a media presentation for general audiences may be shown on the video screen 202.

Also for example, events are typically contemporaneous and, typically simultaneous. For example, a push button event may occur contemporaneous with a camera event, and/or a sensor event. In the case of the push button event occurring contemporaneously or simultaneously, a woman, as detected in a camera event by the camera 204 coupled with the recognition logic of the control unit 222, has activated the push button 212, to dispense water. Should there be more than one content selection, e.g., media presentation for this push button event, the media presentation selected by the control unit 222 will be the one best targeted to women, due to the detection of the woman dispensing water via the push button 212 of the camera event.

Staying with this example, of the contemporaneous, and for example, simultaneous push button and camera events, should the sensors 206 detect multiple adults in close proximity to the machine 104, including the woman, as detected by the camera event, who has pushed the button 212 to dispense water in the push button event, adding this contemporaneous, and for example, simultaneous sensor event, will result in the control unit 222 selecting the best female or crowd oriented content, e.g., media presentation, should multiple content, e.g., media presentations, be associated with the push button event.

Additional control buttons, controls, and the like, for hot/cold, aeration and the like, may be on a touch panel (not shown), attached to the machine, and linked to the control unit 222.

The control unit 222 is linked to the communications network 50 either wired, wirelessly or combinations thereof, and directly or indirectly. The control unit 222 is programmed to map to the home server 102, and also programmed to report all button 212 activations associated with the media presentations which are shown on the monitor 202 to consumers, including the media presentation, to the home server 102, when the button 212 is activated. Data on the activation of the media presentation, and the media presentation itself, resulting from a camera event, sensor event, or a combination thereof, as processed by the control unit 222, as well as in combination with a push button event, as processed by the logic control unit 222, is also sent from the logic control unit 222 to the home server 102 via the network 50. Additionally, this data may also be sent over the network 50 to the content provider 110-110n, either directly or via the homer server 102. This data is also accessible via download from the home server 102.

Figure 3:
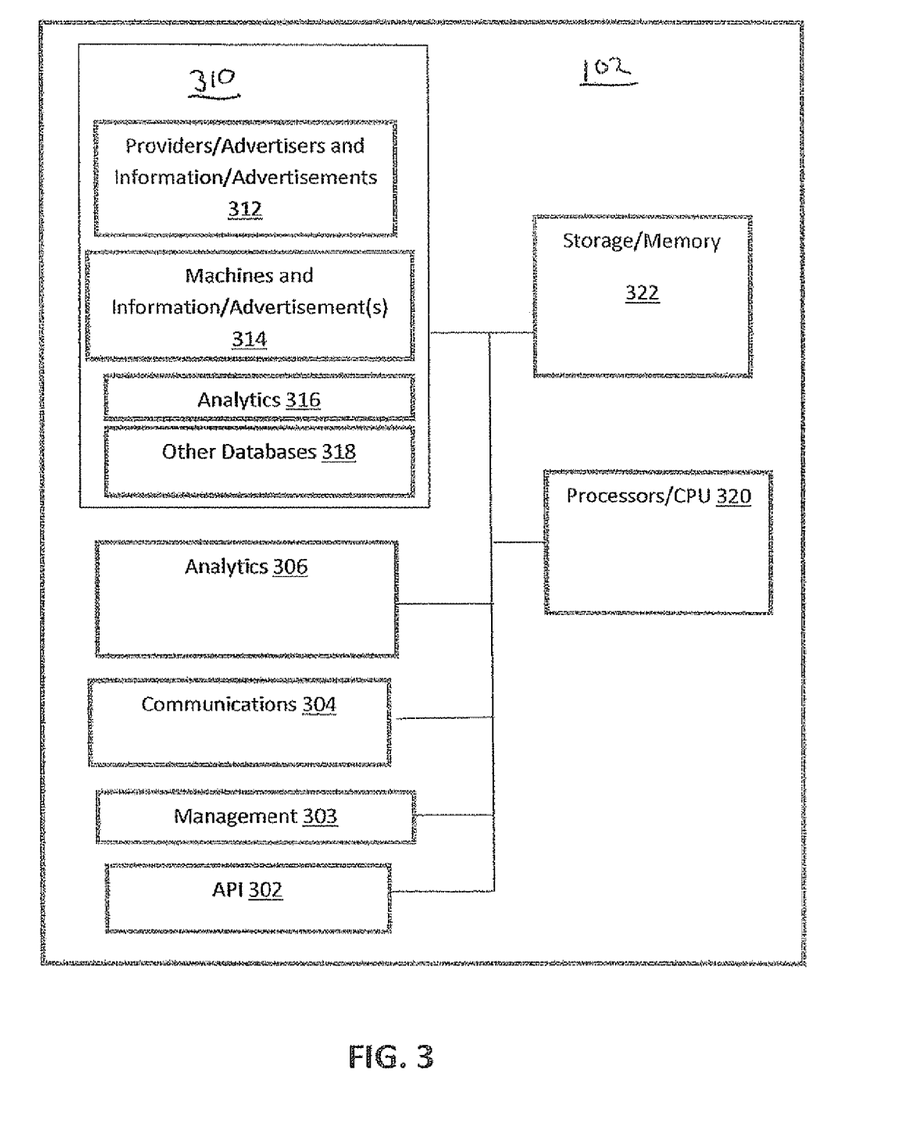
FIG. 3 is an architecture of the home server of FIG. 1.

Attention is now directed to FIG. 3, which shows the architecture of the home server 102. The home server 102 also includes a system, which is also referred to by the element number 102 herein. The home server 102 includes modules 302, 303, 304, 306, databases 310, including databases 312, 314, 316, 318, content storage media 320, processors 330 and storage/memory 332.

An Application Programming Interface (API) module 302 allows for access to applications outside of the system 102, such that these outside applications can interact with the system 102. A management module 303 manages the software and hardware for controlling system 102 operations, including, for example, remote control of the machines 104, content management and content distribution for the machines 104, the collection and compiling of analytics from the machines 104, managing communications between the machines 104, information providers 110a-110n, system administrator 118, with the home server 102, and other functions detailed herein.

A communications module 304 functions to allow the system 102, automatically or via the system administrator 118 to send and receive communications, such as e-mails and other notifications, concerning analytics, the video presentations and the like, over the communications network 50. The analytics module 306 functions to perform the various analytics, calculations and statistical applications, for example, over predetermined time intervals or periods, from the data associated with the push button, camera or sensor events and activations of the media presentation associated with these events. The data may include, for example, the time of the event, such as a time stamp, the place of the event, the actual presentation shown, to whom the presentation was shown (in the case of a camera event), the length of time the button was pressed, or the camera or sensor event occurred, an the like. For example, in the case of a push button event, the time of the water dispensing i.e., a shorter time to fill a cup versus a longer time for dispensing water to fill a bottle, and the like.

A database 310 is shown, with four databases 312, 314, 316, 318 representative of multiple databases of the database 310. The database 312 stores data on the content providers, for example, information providers including advertisers, and their content, for example, media presentations, to be presented and displayed in the respective machines 104, along with any rules for the media presentations. These rules may be the frequency at which a media presentation may be presented, the times at which it can be presented, the audience to whom it can be presented, e.g., general or special, adults or children, men or women, and the like. The database 314 stores data of the actual content, e.g., the specific media presentations thereof, and the machines to which they have been sent, are stored on, or have been displayed on. In both databases 312, 314, the data for the actual content of the media presentations, e.g., the media presentations themselves is stored in the content storage media or content storage 320, or, for example, the cloud storage 116. Both the content storage 320 and cloud storage 116 are accessible over the network 50.

Database 316 stores the analytics data, as processed by the analytics module 304, for each content provider. This data includes all information associated with each event, i.e., push button events, camera events, sensor events, where media presentations were shown on the video screen 202, so as to have been presented to users, as detailed above.

Database 318 is representative of other databases associated with other operations of the system 102.

The processors 330 control the operation of the components of the home server 102. The processors 330 are conventional processors, such as those used in servers, computers, and other computerized devices. The processors 320 may be arranged to have a central processing unit (CPU), for controlling the system 102 and the module 302, 303, 304, 306. For example, the processors may include x86 Processors from AMD and Intel, Xenon® and Pentium® processors from Intel. Other processors, such as those of the modules 302, 303, 304, 306, may be any of the aforementioned processors.

The storage/memory 332 is any conventional storage media. This is also the case for the storage specific to the modules 302, 303, 304, 306. The storage/memory 332 stores machine executable instructions for the processors 320, associated with the operation of the modules 302, 303, 304, 306 and databases 310, as well as other data which may be stored in the home server 102, such as the actual video presentations, of the information providers/advertisers associated with the system 102. Also, the storage/memory 332, although shown as a single component for representative purposes, may be multiple components, and may be outboard from the home server 102, and linked to the network 50.

Figure 4:
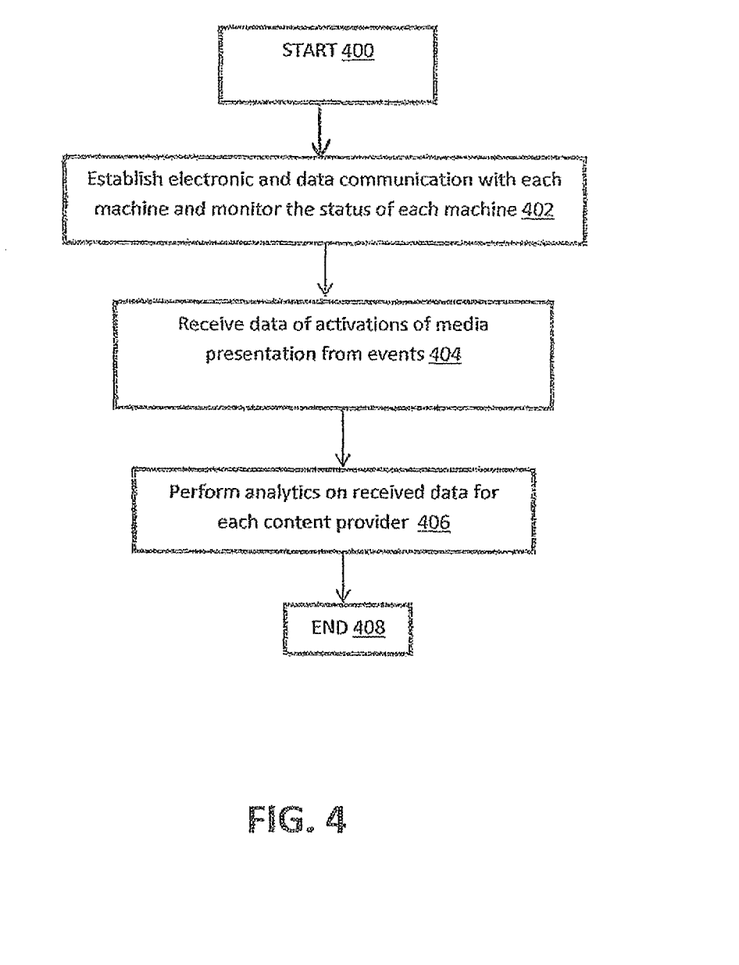
FIG. 4 is a flow diagram of a process in accordance with an embodiment of the present invention.

Attention is now directed to FIG. 4, which is a flow diagram detailing a process in accordance with an embodiment of the disclosed subject matter. Reference is also made to elements shown in FIGS. 1, 2 and 3. The process and subprocesses of FIG. 4 are a computerized process performed by the home server 102. The processes and subprocesses of the aforementioned flow diagram are, for example, performed automatically and in real time.

The process begins at the START block 400. Here, the content, for example, as a media presentation is obtained by the requisite machine, via uploading or downloading. Additionally, the content may be manually loaded into the requisite machine 104, for example, the machine 104 in the Health Club 106. Content for a machine may also be obtained based on the logic of the control unit 222 selecting the machine 104 for the content, or a certain content provider may select a certain machine or location with machines, which will display their content, which is obtained by the requisite machine in accordance with the methods detailed herein. The aforementioned obtaining of content by the machines 104 is such that the content is typically obtained with rules for its presentation to viewers/consumers.

The process moves to block 402, where the home server 102, for example, the system thereof, establishes contact with each machine 104 and monitors the status of each machine 104, to detect activity of each machine 104. This activity includes, for example, recording the data (such as the data detailed above) associated with events, where a media presentation was shown on the display screen 202 to consumers.

The process then moves to block 404, where data is received at the home server 102, over the communications network 50, transmitted from the requisite machine 104 of activations of media presentations, caused by one or more of push button, camera or sensor events, including the actual media presentation shown on the video screen 202. Specifically, the data is transmitted from the control unit 212 to the home server 102, over the network 50, by virtue of the control unit 222 being mapped to the home server 102.

The process moves to block 406, where analytics are performed on the received data for each content provider, by the analytics module 306. The analytics are then stored in the analytics database 316. The analytics may be presented in reports, either sent to each content provider, by the communications module 304, or made accessible to content provider via the API module 302, via downloading, over the network 50. The report may be customized according to the needs of each content provider.

The process moves to block 408, where it ends. The process is repeatable for as long as desired for as many machines 104 are linked to the home server 102 via the network 50.

As used herein, the singular form "a", "an" and "the" include plural references unless the context clearly dictates otherwise.

The word "exemplary" is used herein to mean "serving as an example, instance or illustration," Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

The methods as described above are used in the fabrication of integrated circuit chips.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A dispensing apparatus comprising:
   a drinking water dispensing system for communication with a source of drinking water, the dispensing system including a valve which opens when activated, the valve opening for dispensing drinking water to a receptacle associated with a user;
   a display; and
   a controller, in electrical communication with the drinking water dispensing system and the display, the controller configured for responding to the valve opening for dispensing drinking water by causing content to be presented on the display; the controller including at least one processor programmed to select the content for the presenting on the display.

2. The dispensing apparatus of claim 1, additionally comprising sensors for detecting at least one of people in proximity to the dispensing apparatus and motion of people in proximity to the dipensing apparatus, the sensors in electronic communication with the controller; and the at least one processor additionally programmed to select the content based on at least one of the type or people or numbers of people, which are detected in said proximity to the dispensing apparatus.

3. The dispensing apparatus of claim 2, additionally comprising a camera in electronic communication with the controller for recognizing at least one person as at least one of a man, woman, adult, child, male and female.

4. The dispensing apparatus of claim 1, the controller is configured for detecting at least one additional event, and for selecting content from content storage media for displaying on the display, in response to the detection of the at least one additional event.

5. The dispensing apparatus of claim 1, additionally comprising: content storage in electronic communication with the controller, and the processor of the controller is additionally programmed for selecting content for display from the content storage media.

6. The dispensing apparatus of claim 1, wherein the controller is configured for linking to a communications network.

7. The dispensing apparatus of claim 6, wherein the processor of the controller is programmed for recording data associated with each valve opening and the content associated with each valve opening.

8. The dispensing apparatus of claim 7, wherein the controller transmits the recorded data associated with each valve opening and the content associated with each valve opening, over the communications network.

9. The dispensing apparatus of claim 4, additionally comprising a camera, and wherein the at least one additional event includes detection of at least one a man, woman, adult, child, male, and female, from an image obtained by the camera.

10. A system for displaying content comprising:
a computer system comprising:
 a storage media; and,
 a processor in communication with the storage media, the processor programmed to perform the machine executable instructions in the storage media including:
  receiving data from a remote drinking water dispensing apparatus associated with: 1) valve openings for dispensing drinking water, as detected by the remote drinking water dispensing apparatus and, 2) content displayed on a display associated with the remote drinking water dispensing apparatus in response to the detected valve openings for dispensing drinking water; and,
  organizing the data to be available to the provider of the content over a communications network.

11. The system of claim 10, wherein the computer system additionally comprises:
a content storage unit; and,
the processor in communication with the storage media, the processor programmed to perform the machine executable instructions in the storage media additionally including:
 transmitting content over the communications network, from the content storage unit to the remote drinking water dispensing apparatus for displaying the content contemporaneous with the valve openings, on the display.

12. The system of claim 11, wherein the processor is additionally programmed to receive data associated with 1) the recognition of at least one person as at least one of a man, woman, adult, child, male, female, 2) the detection of people in proximity to the remote drinking water dispensing apparatus, and 3) the detection of motion of people around the remote drinking water dispensing apparatus, the data from sensors associated with the remote drinking water dispensing apparatus.

13. A method for providing content comprising:
detecting dispensing of drinking water from a drinking water dispensing system, the drinking water dispensing system, 1) including a valve in communication with a drinking water source, the valve opening when activated; and, 2) associated with a display apparatus;
obtaining content for display on the display apparatus in response to the dispensing of drinking water, by a valve opening being detected; and,
displaying the content on the display apparatus contemporaneously with the dispensing of the drinking water in response to the detecting of the valve opening.

14. The method of claim 13, wherein the obtaining content for display additionally includes selecting the content based on detecting, by a sensor associated with the drinking water dispensing system, the presence of one or more people proximate to the drinking water dispensing system.

15. The method of claim 13, wherein the content includes a media presentation.

16. A method for providing content comprising:
monitoring the status of at least one drinking water dispensing machine which presents content in response to a valve opening, through which drinking water is dispensed from a source, by detecting the valve opening associated with the dispensing of drinking water, by the at least one drinking water dispensing machine, over a communications network;
receiving data corresponding to content presentations in response to the detection of the dispensing of drinking water; and
performing analytics on the received data for each content provider associated with the content presented in response to the dispensing of drinking water by the valve opening, by the at least one drinking water dispensing machine.

17. The method of claim 16, wherein the at least one drinking water dispensing machine includes a plurality of drinking water dispensing machines.

18. The method of claim 16, wherein the communications network includes the Internet.

19. The dispensing apparatus of claim 6, wherein the processor is additionally programmed for selecting the content for display from over the communications network.

20. The dispensing apparatus of claim 1, wherein the at least one processor is additionally programmed to select the content from multiple content.

21. The dispensing apparatus of claim 20, wherein the at least one processor is additionally programmed to select the content from multiple content sources.

22. The dispending apparatus of claim 1, wherein the drinking water dispensing system additionally includes a push button in communication with the valve, such that the valve opening is caused by contact with the push button.

* * * * *